(12) United States Patent
Steimer

(10) Patent No.: US 9,722,502 B2
(45) Date of Patent: Aug. 1, 2017

(54) CONVERTER ARRANGEMENT

(71) Applicant: ABB Technology AG, Zurich (CH)

(72) Inventor: Peter Steimer, Ehrendingen (CH)

(73) Assignee: ABB Schweiz AG (CH)

( * ) Notice: Subject to any disclaimer, the term of this patent is extended or adjusted under 35 U.S.C. 154(b) by 0 days.

(21) Appl. No.: 15/052,534

(22) Filed: Feb. 24, 2016

(65) Prior Publication Data

US 2016/0172991 A1 Jun. 16, 2016

Related U.S. Application Data

(63) Continuation of application No. PCT/EP2014/068507, filed on Sep. 1, 2014.

(30) Foreign Application Priority Data

Aug. 30, 2013 (EP) .................................... 13182394
Oct. 4, 2013 (EP) .................................... 13187363

(51) Int. Cl.
*H02M 5/45* (2006.01)
*H02M 5/44* (2006.01)
(Continued)

(52) U.S. Cl.
CPC .............. *H02M 5/44* (2013.01); *H02M 1/32* (2013.01); *H02M 5/293* (2013.01);
(Continued)

(58) Field of Classification Search
CPC . G05F 1/614; G05F 1/618; G05F 1/59; G05F 1/569; G05F 1/571; G05F 1/575;
(Continued)

(56) References Cited

U.S. PATENT DOCUMENTS

| 5,808,452 A | * | 9/1998 | Gyugyi | ................. | H02J 3/1814 |
| | | | | | 323/207 |
| 2011/0235221 A1 | * | 9/2011 | Vogeli | ..................... | H02M 1/32 |
| | | | | | 361/18 |
| 2013/0070491 A1 | * | 3/2013 | Jiang-Hafner | ............ | H02J 3/36 |
| | | | | | 363/41 |

FOREIGN PATENT DOCUMENTS

| EP | 1786010 A1 | 5/2007 |
| WO | 2012010067 A1 | 1/2012 |

OTHER PUBLICATIONS

Ahmed, et al., HVDC SuperGrids with Modular Multilevel Converters—the Power Transmission Backbone of the Future, 2012—9th International Multi-Conference on System, Signals and Devices, 7 pages.

(Continued)

*Primary Examiner* — Fred E Finch, III
*Assistant Examiner* — Lorena Bruner
(74) *Attorney, Agent, or Firm* — Taft Stettinius & Hollister LLP

(57) ABSTRACT

A converter arrangement comprises first and second modular multilevel converters, Each of the modular multilevel converters comprises two converter branches. Each converter branch comprises a plurality of series-connected converter cells. Each converter cell comprises a cell capacitor and semiconductor switches for connecting and disconnecting the cell capacitor to the converter branch. At least two converter branches of the first modular multilevel converter are connected via first branch connection point and at least two converter branches of the second modular multilevel converter are connected via second branch connection point. The multilevel converters are connected in parallel via a phase connection point for connecting the converter arrangement to a load or a power source, wherein the phase connection point is connected via a first inductance with the (Continued)

first branch connection point and/or via a second inductance with the second branch connection point. At least one of the modular multilevel converters comprises a protection system.

20 Claims, 4 Drawing Sheets

(51) Int. Cl.
H02M 5/293 (2006.01)
H02M 5/458 (2006.01)
H02M 1/32 (2007.01)
H02M 7/483 (2007.01)
H02M 7/493 (2007.01)
H02M 1/00 (2006.01)

(52) U.S. Cl.
CPC .......... *H02M 5/4585* (2013.01); *H02M 7/493* (2013.01); *H02M 2001/0009* (2013.01); *H02M 2007/4835* (2013.01)

(58) Field of Classification Search
CPC .. G05F 1/573; G05F 3/158; H02M 2001/083; H02M 2001/045; H02M 2001/0067; H02M 3/158; H02M 1/452; H02M 1/455; H02M 5/4835; H02M 2007/4835; H02M 5/4585; H02M 7/493; H02M 1/32; H02M 2001/0009
USPC ........................ 363/37, 16–17, 40, 55–86.05, 363/56.07–56.08, 56.1, 56.12, 58, 68, 69, 363/71, 79, 95, 98, 109, 120, 131; 323/235, 267, 268–272, 276, 329, 351
See application file for complete search history.

(56) References Cited

OTHER PUBLICATIONS

Suh, et al., Application of IGCT in High-Power Rectifiers, IEEE Transactions on Industry Applications, vol. 45, No. 5, Sep./Oct. 2009, 9 pages.
Xu, et al., Control of Parallel Multirectifiers for a Direct-Drive Permanent Magnet Wind Power Generator, IEEE Transactions on Industry Applications, vol. 49, No. 4, Jul./Aug. 2013, 10 pages.
European Search Report, EP13187363.0, Jun. 12, 2014.
International Search Report and Written Opinion, PCT/EP2014/068507, Jul. 6. 2015.

* cited by examiner

CONVERTER ARRANGEMENT

FIELD OF THE INVENTION

The invention relates to the field of electrical power conversion. In particular, the invention relates to a converter arrangement for converting a first AC or DC current into a second AC or DC current of different frequency and/or different voltage.

BACKGROUND OF THE INVENTION

For driving an electrical load, such as an electrical motor, from an electrical grid, an electrical converter may convert a possible multiphase current from the grid into a possible multiphase current to be supplied to the load.

Such electrical converters are also used for supplying the electrical energy generated by a power source into an electrical grid. For example, a current of variable frequency, which is generated by a generator of a hydroelectric power plant or of a wind turbine, may be converted into a current of fixed frequency to be supplied to the grid.

Furthermore it is possible to interconnect two electrical grids with an electrical converter. In this case, the power flow may be in both directions.

Modular multilevel converters are a special type of electrical converter that may be especially suited for converting current of high energy and high voltage. Such a converter has a modular design and comprises converter cells connected in series. Each converter cell usually has two or four semiconductor switches and a cell capacitor. The power stored in the converter is not stored in a rather small number of DC link capacitors but in the cell capacitors, which are also subjected only to a smaller voltage compared to other types of converters.

For converting even higher currents with high voltages, it is possible to connect modular multilevel converters in parallel. Paralleling on converter level may be beneficial due to no or nearly no voltage/current derating compared to device paralleling and cell level paralleling, due to the fact that centralized inductor losses may be lower than distributed inductor losses compared to cell- and branch level paralleling and that more sinusoidal inductor voltages/currents usually result in fewer losses compared to branch level paralleling.

DESCRIPTION OF THE INVENTION

However, in the case of two or more modular multilevel converters connected in parallel, circulating currents may occur that flow between the converters and that may result in higher losses, since power semiconductor switches also have to switch currents that do not transport energy between the sides of the converter. Furthermore, the circulating currents may complicate the control of the converter arrangement comprising the converters connected in parallel.

It is an object of the invention to provide electrical power conversion with low losses and with an easy to control converter arrangement.

This object is achieved by the subject matter of the independent claims. Further exemplary embodiments are evident from the dependent claims and the following description.

An aspect of the invention relates to a converter arrangement, comprising modular multilevel converters connected in parallel. The converter arrangement may be adapted for converting an AC current into an AC current, for converting a DC current into an AC current, or for converting a DC current into an DC current. Both currents may be single-phase or multiphase.

According to an embodiment of the invention, the converter arrangement comprises at least first and second modular multilevel converters; wherein each of the at least first and second modular multilevel converters comprises at least two converter branches; wherein each converter branch comprises a plurality of series-connected converter cells, each converter cell comprising a cell capacitor and semiconductor switches for connecting the cell capacitor to the converter branch; wherein the at least two converter branches of the first modular multilevel converter are connected via a first branch connection point and the at least two converter branches of the second modular multilevel converter are connected via a second branch connection point; wherein the at least first and second multilevel converters are connected in parallel via a phase connection point for connecting the converter arrangement to a load or a power source, wherein the phase connection point is connected via a first inductance with the first branch connection point and via a second inductance with the second branch connection point.

In other words, the converter arrangement comprises inductances between a common phase connection point, which may be seen as an input or output of the converter arrangement, and branch connection points, which may be seen as inputs or outputs of the modular multilevel converters connected in parallel. These (first and second) inductances are adapted for damping and/or controlling a circular current between the first and second converters.

According to an embodiment of the invention, each of the first and second modular multilevel converters comprises converter branches for at least two phases, and the converter branches of each phase are connected via an inductance for each phase with a phase connection point for each phase or a pair of two converter branches of the first and the second modular multilevel converter (12a, 12b) share one or more inductances. In the case, where the converters (at the respective input or output side) comprise more than one phase (usually three phases), each of the respective phases of the first converter may be connected with the respective phase of the second converter via a phase connection point for each phase. A separate inductance for each phase is arranged between the phase connection point and the branch connection point. It has to be noted that these inductances may not be coupled with each other (for example via a common core). However, it also may be possible that they are coupled.

According to an embodiment of the invention, each of the at least two converter branches of each of the at least first and second modular multilevel converters is connected via a branch inductance with the respective converter branch connection point. The branch inductances may be used for damping and/or controlling circulating currents between the converter branches of the respective converter. For example, the two branches of each phase of an indirect converter may be connected via two inductances with each other, which share a common core. It is also possible that the converter branches of a phase of a direct converter are connected via star-connected inductances.

In summary, it may be possible that at one side of the converter arrangement, the load or power source is connected via a first inductance for damping and/or controlling circulating currents between parallel converters and a second inductance for damping and/or controlling circulating current between converter branches with a converter branch of a modular multilevel converter.

According to an embodiment of the invention, the at least first and second modular multilevel converters comprises a subconverter for converting an AC current into a DC current. For example, one or both of the converters may be indirect converters and may comprise a first modular multilevel subconverter as active rectifier, which is connected via a DC link with a second modular multilevel subconverter for converting the DC link voltage into an AC output current.

According to an embodiment of the invention, each of the at least first and second modular multilevel converters is an indirect converter comprising an active rectifier connected via a DC link with an inverter.

In general, such modular multiphase converters that are adapted for converting an AC current into a DC current and/or vice versa, comprise two converter branches that are connected in series between two DC outputs for each phase and provide a branch connection point between them for each phase.

According to an embodiment of the invention, the first modular multilevel converter comprises a first DC link, and the second modular multilevel converter comprises a second DC link, which is galvanically separated from the first DC link. In other words, the indirect converters connected in parallel may comprise separated DC links. It has to be noted that a DC link of a modular multilevel converter usually has no DC link capacitors. The DC link merely may comprise two DC outputs of the active rectifier connected with two DC inputs of the inverter.

According to an embodiment of the invention, the at least first and second modular multilevel converters comprise a common DC link. It is also possible that the two DC outputs of a first rectifier are connected with the two DC outputs of a second rectifier, which are connected with the two DC inputs of a first inverter and the two DC inputs of a second inverter.

According to an embodiment of the invention, the first and second modular multilevel converters are direct converters. However, it is also possible that the first converter is an indirect converter and the second converter is a direct converter. In a direct modular multilevel converter, each branch connection point for each phase on a first AC side of the converter is connected via a converter branch with a branch connection point for each phase of a second AC side of the converter.

According to an embodiment of the invention, the converter arrangement comprises a transformer and the at least first and second modular multilevel converters are connected via a transformer-side phase connection point with the transformer, such that the at least first and second modular multilevel converters are galvanically connected. In other words, the two converters may be connected to the same secondary winding of the transformer.

According to an embodiment of the invention, the transformer-side phase connection point is connected via a first transformer-side inductance with a first transformer-side branch connection point and via a second transformer-side inductance with a second transformer-side branch connection point. The circulating currents on the transformer side of the converter arrangement may be damped via inductances that are connected between the transformer and the parallel converters.

According to an embodiment of the invention, the at least first and second modular multilevel converters are galvanically connected via a load-side phase connection point to a load or a power source. The load-side phase connection point is connected via a first load-side inductance with a first load-side branch connection point and via a second load-side inductance with a second load-side branch connection point.

On the other side (opposite to the transformer), the load or power source also may be connected via inductances with the parallel converters for damping and/or controlling circulating currents on this side of the converter arrangement.

According to an embodiment of the invention, the at least first and second modular multilevel converters are galvanically separated on one of the sides of the converter arrangement, for example at a transformer side. In the case of a galvanic separation, circulating currents are not possible and the corresponding inductance may not be necessary.

According to an embodiment of the invention, the first modular multilevel converter is connected via a first transformer to a phase connection point, and the second modular multilevel converter is connected via a second transformer to the phase connection point. The galvanic separation may be achieved with two transformers that are connected in parallel.

According to an embodiment of the invention, the first modular multilevel converter is connected to a first secondary winding of a transformer, and the second modular multilevel converter is connected to a second secondary winding of a transformer. As an alternative, the galvanic separation may be achieved with a transformer comprising two secondary windings (and one primary winding, which may be arranged on a common core).

In general, high power converters, such as modular multilevel converters, usually need a reliable protection system. A protection firing, for example by switching all converter cells to a zero voltage output state, may start to work at the limits of the semiconductor and no backup system may be available.

A further aspect of the present disclosure relates to a converter arrangement with a modular multilevel converter, wherein the modular multilevel converter comprises at least two phases, each phase comprising at least one converter branch with a plurality of series-connected converter cells, each converter cell comprising a cell capacitor and semiconductor switches for connecting the cell capacitor to the converter branch; wherein the converter branch for each of the phases is connected via a phase connection point for each phase to a load or power source; and wherein the converter arrangement comprises a protection system. The protection system as described herein after may be provided not only for the converter arrangement with two parallel modular multilevel converters as described above, but in general to a converter arrangement with only one modular multilevel converter.

However, according to an embodiment of the invention, at least one of the first and second modular multilevel converters comprises such a protection system.

According to an embodiment of the invention, the protection system comprises a fault detection device; a mechanical or paraelectronic switch for interconnecting at least two phases at the branch connection point of the associated modular multilevel converter; and a controller adapted for switching converter cells of the associated modular multilevel converter to zero output voltage and for closing the switch, when receiving a fault signal from the fault detection device. The protection system may be adapted for handling all special fault cases reliably. Faults which may be covered and/or may be detected by the fault detection device are arc faults, double earth faults, and internal converter faults.

A further aspect of the present disclosure relates to a method for protecting the converter arrangement, which, for example, may be executed by the controller.

According to an embodiment of the invention, the method comprises the steps of: receiving a fault signal from the fault detection device; switching converter cells of the associated modular multilevel converter to zero output voltage, and closing the switch.

Further aspect of the present disclosure relates to a computer program, which, when being executed by a processor is adapted for performing the steps of this method, and a computer-readable medium on which such a computer program is stored. For example, the controller may comprise such a processor and a non-volatile memory for storing the computer program.

According to an embodiment of the invention, the switch comprises at least one of a magnetically actuated switch and a pyrotechnically actuated switch. In general, the switch may be adapted for closing an electrical connection with two touching contacts that are brought into contact via movement.

According to an embodiment of the invention, a converter cell is switched to zero voltage by closing a semiconductor switch of the converter cell, which is interconnecting outputs of the converter cell, for example by short-circuiting the converter cell.

According to an embodiment of the invention, the switch is additionally adapted for connecting the at least two phases with a ground potential. For example, in the case of three phases, each of the phases may be connected with a single-phase switch with the ground potential.

According to an embodiment of the invention, the fault detection device comprises a current sensor for sensing an over-current in the at least two phases at the phase connection point.

According to an embodiment of the invention, the current sensor is adapted for measuring a current between the phase connection point and an inductance before a branch connection point for connecting at least two converter branches of the modular multilevel converter. This inductance may be the first and/or second inductance as mentioned above for damping and/or controlling circulating currents.

According to an embodiment of the invention, the controller is adapted for closing the switch after a predefined time after the switching of the converter cells to zero voltage output. For example, the predefined time does not differ by more than 10% from the period of a frequency of a current in the branch connection point. In such a way, the switch is closed in the vicinity of a zero-crossing of the respective current.

According to an embodiment of the invention, the converter arrangement comprises at least two modular multilevel converters, which are connected in parallel via a common phase connection point and/or at least two modular multilevel converters, which are connected in series via a DC link. The converter arrangement may comprise a protection system for each of the at least two converters. When receiving a fault signal, one first protection system is adapted for transmitting the fault signal to another second protection system, which is adapted for switching converter cells of an associated converter to zero output voltage and for closing an associated mechanical or paraelectronic switch, when receiving a fault signal from the first protection system. The protection systems for each converter (or subconverter) may together form a protection system for the converter arrangement. When one of the protection systems determines a fault, the other protection systems are informed about the fault and also switch their converter cells to zero voltage and to short-circuit the respective output phases of the associated converter.

According to an embodiment of the invention, the protection system comprises a first mechanical or paraelectronic switch at a first AC side of a first side converter and a second mechanical or paraelectronic switch at a second AC side of a second side converter. Both sides of a (indirect or direct) converter may be protected by a protection system. The protection system may be adapted for closing the first mechanical or paraelectronic switch after a first time after the switching the converter cells to zero voltage output and for closing the second mechanical or paraelectronic switch after a second time different from the first time. The first and second times may be adapted to the frequency of the currents in the respective first and second side of the converter.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
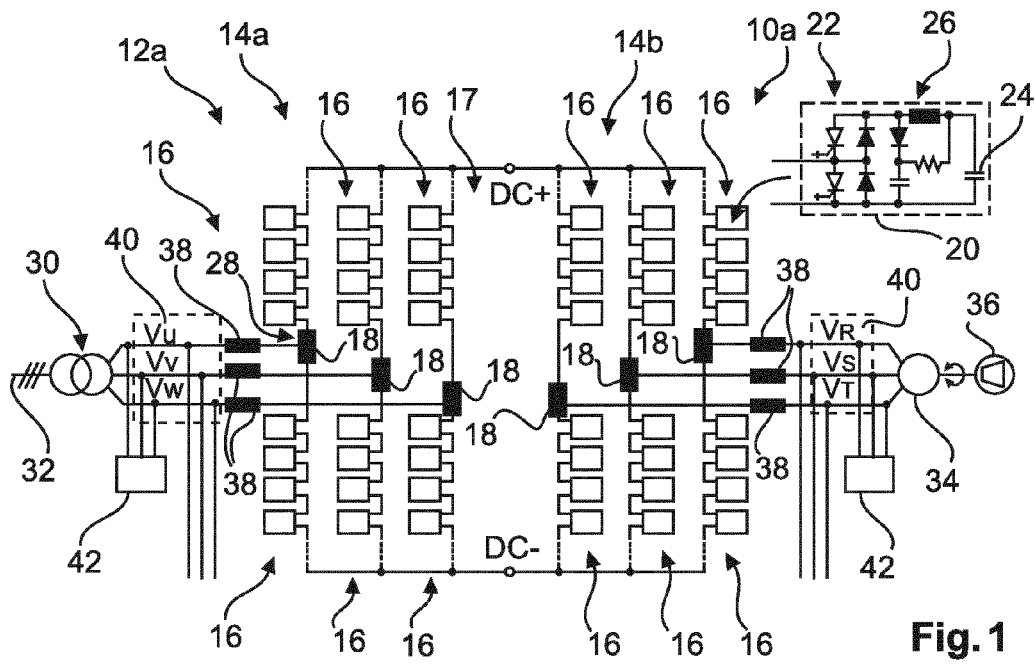
FIG. 1 schematically shows a converter arrangement according to an embodiment of the invention.

FIG. 1 shows a converter arrangement 10a with a modular multilevel converter 12a comprising two modular multilevel subconverters 14a, 14b. For each phase $V_U$, $V_V$, $V_W$, $V_R$, $V_S$, $V_T$, each subconverter 14a, 14b comprises two converter branches 16 that are connected in series between two outputs/inputs DC+ and DC− of a DC link 17, and that provide a branch connection point 18 between them.

Each converter branch 16 comprises a plurality of converter cells 20 that are connected in series. Each converter cell 20 comprises semiconductor switches 22 and a cell capacitor 24. In FIG. 1, a unipolar converter cell 20 that is used with the indirect converter 12a with a snubber circuit 26 is shown. For example, the semiconductor switches 22 may comprise an IGCT with an antiparallel diode (as in FIG. 1), an RC-IGCT (as in FIG. 8 below), an IGBT or other actively switchable semiconductor elements.

The converter branches 16 are connected via an inductance 28 with the branch connection point 18. The inductance 28 may be an inductor or coil on a magnetic core or with an air core. The inductances 28 connected to the branch connection point of one phase are coupled via a common magnetic core and may be seen as a branch reactor for damping and/or controlling circulating currents between the branches 16 of the converter 12a or subconverter 14a, 14b.

The subconverter 14a is connected via a transformer 30 to an electrical grid 32. The subconverter 14b is connected to an electrical machine 34, for example a generator or, as depicted, an electrical motor 34 for driving a pump or turbine 36.

The branch connection points 18 are connected via inductances 38 with the load 34, 36 or power source 30, 32. Also the inductances 38 may be inductors or coils with magnetic cores. However, the inductances 38 are not coupled with each other.

The branch connection points 18 of the grid-side subconverter 14a are connected via grid-side phase connection points 40 with the transformer 30, and the branch connections points 18 of the load-side converter 14b are connected via load-side phase connections points 40 with the motor 34. The phase connection points 40 are used for connecting a further parallel converter (such as depicted in FIG. 2) with the load 34, 36 and power source 30, 32.

The inductances 38 are used for damping and/or controlling circulating currents between the converter 12a and the parallel converter connected via the phase connection points 40. In such a way, the inductances 38 may be seen as paralleling reactors.

Between the transformer 30 and the grid-side phase connection points 40, and/or between the motor 34 and the load-side phase connection points 40, a dv/dt-filter 42 may be connected with the respective phases.

Figure 2:
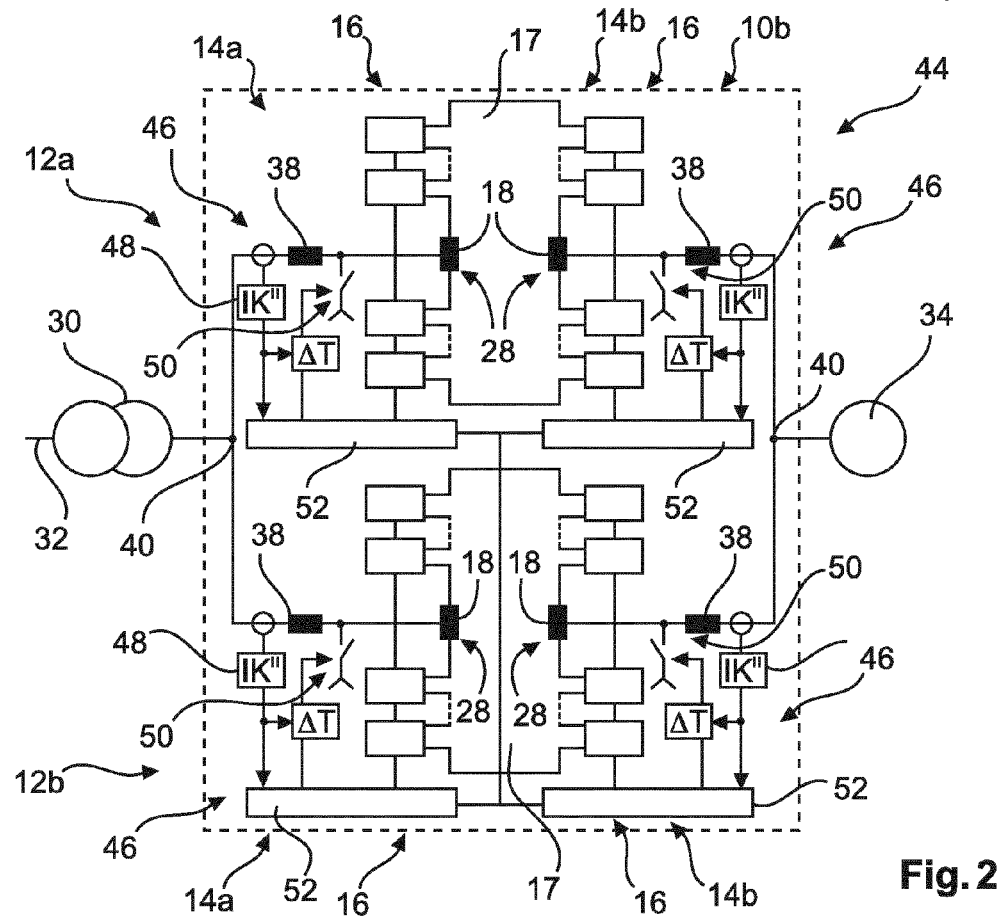
FIG. 2 schematically shows a converter arrangement according to a further embodiment of the invention.

FIG. 2 shows a further embodiment of a converter arrangement 10b with two parallel modular multilevel converters 12a, 12b. The converter arrangement 10b is shown as single-phased on both sides of the converters 12a, 12b. However, it also may be possible that the converter arrangement 12b is multiphased on one or both sides; i.e. the converters 12a, 12b may be designed like the converter 12a shown in FIG. 1.

FIG. 2 also shows a protection system 44 for the converter arrangement 10b that comprises a protection (sub-)system 46 for each subconverter 14a, 14b.

Each protection system 46 comprises a fault detection sensor 48, a mechanical switch 50, and a controller or control hub 52. The fault detection sensor 48 is adapted for measuring currents between the phase connection point 40 and the inductance 38 and/or the branch connection point 18. The mechanical switch 50 is adapted for short-circuiting the phases and/or for grounding one or more phases between the phase connection point 40 and/or the inductance 38 and the branch connection point 18.

In the case of converter faults, the controller 52 turns off the needed power semiconductors 22 within microseconds and brings the whole converter 14a, 14b to a safe state. For example, converter over-currents may be treated in this manner.

Other faults such as arc-faults, double ground faults, and converter internal short-circuits, which may be measured with the sensor 48, may be handled by the controller 52 in the following way: After the detection of a fault, all converter cells 20 may be switched to zero voltage, for example by closing the semiconductor switch 22, which interconnects the two outputs of the unipolar cell as shown in FIG. 1. Simultaneously or after a short time period ΔT, the mechanical switch is used for short-circuiting and/or grounding the phases of the converter 14a, 14b.

The time period ΔT may be controlled and/or may be set to a period of the frequency of the corresponding current, such as 20 ms.

A controlled timing of the short-circuiting of the phases with respect to the switching of the converter cells to zero output may have the following advantages: A fast reaction by switching the converter cells is possible that is faster than the short-circuiting of the phases. Such an overall applied zero voltage switching on cell level may short-circuit all converter potentials and may extinguish fast any arc fault. This may be called semiconductor based protection firing. During faults, diodes of the converter cells 20 are not excessively used, which may result in a more efficient utilization of reversely conducting semiconductors such as RC-IGCTs.

Simultaneously, the other protection systems 46 are informed about the fault, which also synchronously switch the converter cells 20 and short-circuit the phases correspondingly. The time periods ΔT on different sides of the converter arrangement (corresponding to different frequencies) may differ from each other.

A synchronized protection may have the following advantages: A synchronous semiconductor based protection firing in the converter cells 20 may result in a homogenous distribution of the short-circuit stress over the converter branches 16. A synchronous mechanical switch firing may result in a homogenous distribution of the short-circuit stress over the converter arrangement. A synchronous grid-side and machine-side firing may protect the full converter arrangement after the first fault detection at grid or machine side.

As shown in FIG. 2, every subconverter 14a, 14b is provided with an inductance 38 or paralleling reactor 38 at its AC side. When each converter arm is provided with an inductance 38 (as well as a mechanical switch 50), this may enhance the modularity of the converter arrangement. However, also a centralized inductance instead of distributed inductances 38 may be used.

The inductances 38 or paralleling reactors 38 also may be used as the reactors required for bypass operation.

Figure 3:
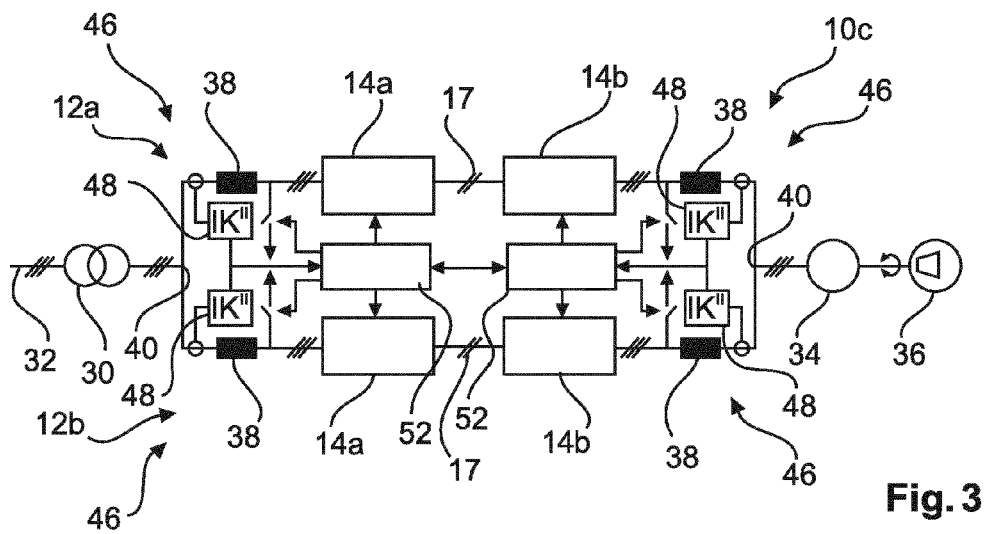
FIG. 3 schematically shows a converter arrangement according to a further embodiment of the invention.

FIG. 3 shows a further embodiment of a controller arrangement 10c, in which the subconverters 14a, 14b are only shown as abstract rectangles but also may have the components as shown in FIGS. 1 and 2. A controller 52 is used for both the active rectifiers 14a and both the inverters 14b after the DC link.

Figure 4:
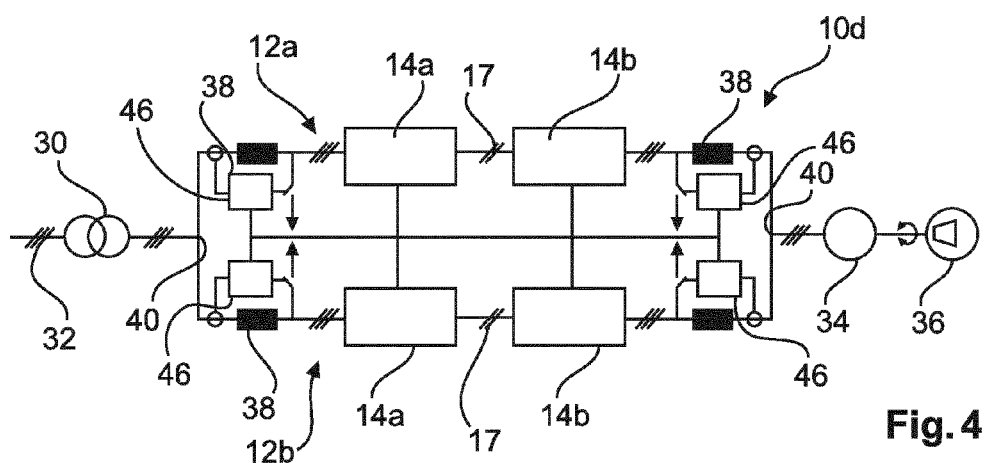
FIG. 4 schematically shows a converter arrangement according to a further embodiment of the invention.

FIG. 4 shows a further embodiment of a controller arrangement 10d, in which the protection systems 46 are depicted in a more abstract way. In FIGS. 4 to 7, possible paralleling configurations with indirect modular multilevel converters 12a, 12b for further embodiments of converter arrangements 10d, 10e, 10f, 10g are shown.

Figure 7:
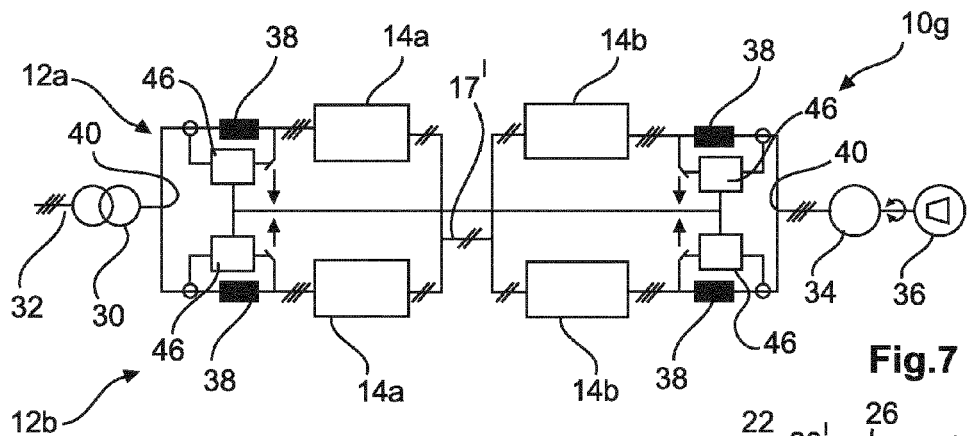
FIG. 7 schematically shows a converter arrangement according to a further embodiment of the invention.

In FIGS. 4 and 7, the converters 12a, 12b are galvanically connected via the secondary winding of a two-winding transformer 30 on the grid side. Therefore, inductances 38 are provided on the grid-side.

Figure 5:
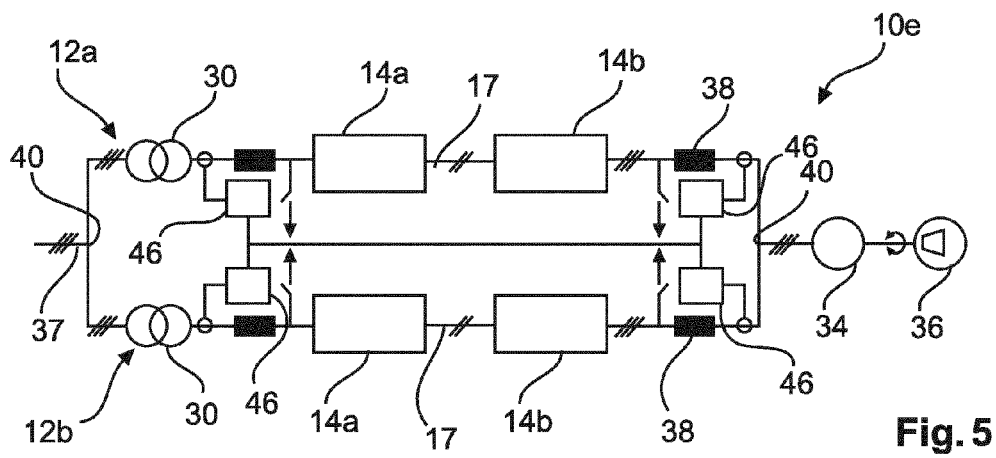
FIG. 5 schematically shows a converter arrangement according to a further embodiment of the invention.
Figure 6:
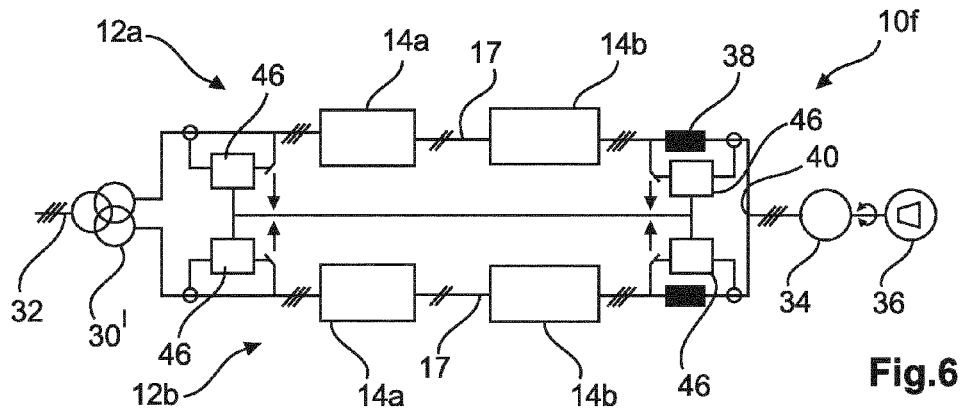
FIG. 6 schematically shows a converter arrangement according to a further embodiment of the invention.

In FIGS. 5 and 6, the converters 12a, 12b are galvanically separated either by the two-winding transformers 30 connected in parallel or by a 3-winding transformer 30'. The inductances 38 on the grid side are avoided.

In FIGS. 4, 5 and 6, the converters 12a, 12b have separated DC links 17. In FIG. 7, the parallel converters 12a, 12b share a common DC link 17'. In FIG. 7, with common DC link 17', there may be two separate ground potentials for the grid- and machine-side subconverters 14a, 14b. The embodiments of FIGS. 1 to 6 may have a single ground potential.

In all embodiments shown in FIGS. 4 to 7, the converters 12a, 12b are galvanically connected at the load-side or machine side. Therefore, always inductances 38 are provided at this side.

The following table shows a comparison of the configurations described above:

| Embodiments 10a to 10d | Embodiment 10e | Embodiment 10f | Embodiment 10g |
|---|---|---|---|
| Simple transformer 30 (easier production for high powers) | Two transformers 30 (may be preferable for very high powers) | More complex transformer 30' (expectedly) | Simple transformer 30 (easier production for high powers) |
| Grid-side paralleling inductances 38 may be needed | Grid-side paralleling inductances 38 not needed | Grid-side paralleling inductances 38 not needed | Grid-side paralleling inductances 38 may be needed |
| Two DC-link lines 17 for remote grid- and machine side sub converters 14a, 14b | Two DC-link lines 17 for remote grid- and machine side sub converters 14a, 14b | Two DC-link lines 17 for remote grid- and machine side sub converters 14a, 14b | Single DC-link line 17' for remote grid- and machine side converters 14a, 14b |
| No extra busbars between paralleled converters 12a, 12b for close grid- and machine side converters 14a, 14b | No extra busbars between paralleled converters 12a, 12b for close grid- and machine side converters 14a, 14b | No extra busbars between paralleled converters 12a, 12b for close grid- and machine side converters 14a, 14b | Extra busbars between paralleled converters 12a, 12b for close grid- and machine side converters 14a, 14b |

Figure 8:
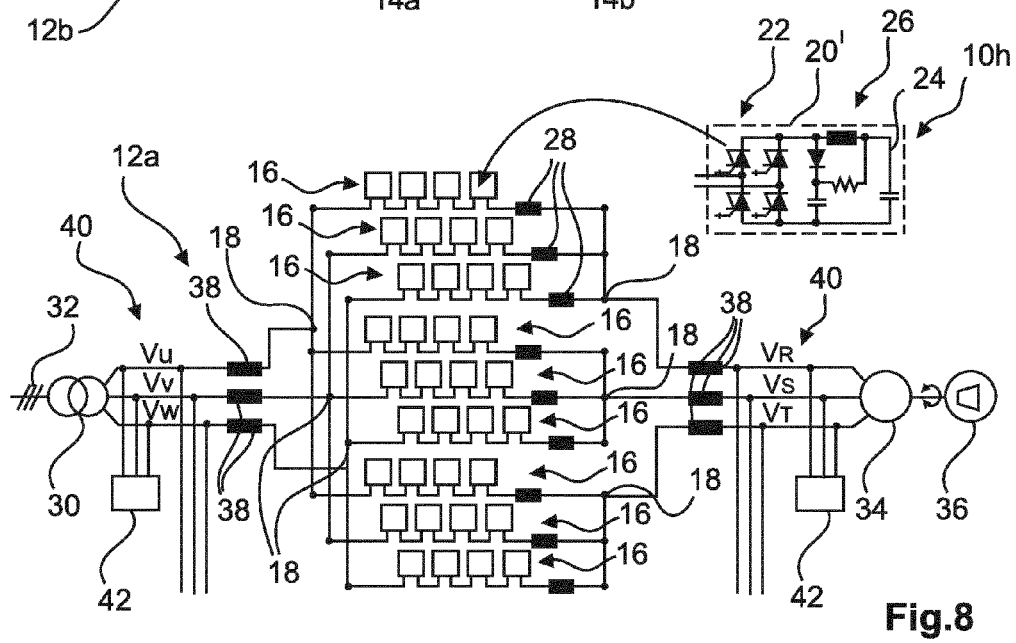
FIG. 8 schematically shows a converter arrangement according to a further embodiment of the invention.

FIG. 8 shows a further embodiment of a converter arrangement 10h, analogously to FIG. 1, with the main differences that the modular multilevel converter 12a is a direct converter. The direct converter 12a interconnects directly the phases $V_U$, $V_V$, $V_W$ of the grid-side with the phases $V_R$, $V_S$, $V_T$ of the load-side, wherein each phase of the grid-side is connected via a converter branch 16 with the load side. The converter cells 20' of the direct converter 12a are bipolar cells with four semiconductor switches 22.

The branch inductors 28 of the indirect converter 12a are not coupled; therefore, they may take over the function of the paralleling inductors 38. Thus, it is possible that the configurations shown in FIG. 8 to FIG. 11 only have paralleling inductances 38 on the side without the branching inductances 28.

Figure 9:
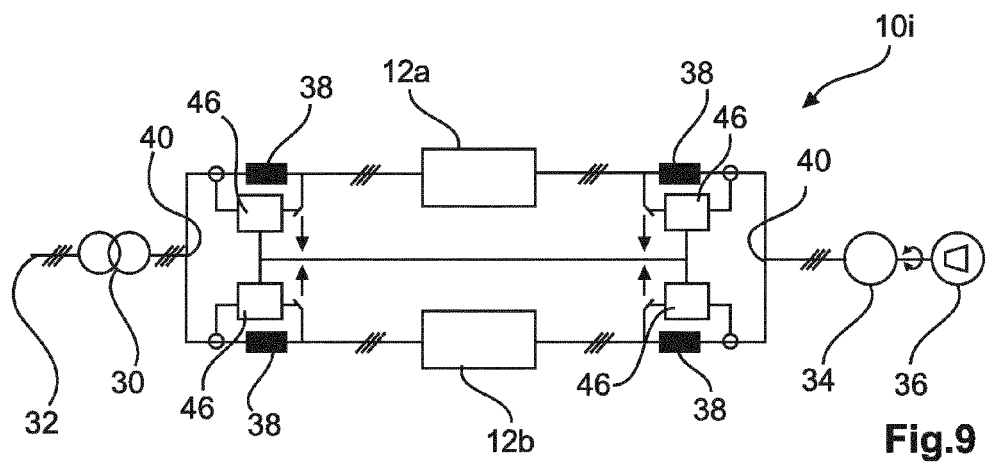
FIG. 9 schematically shows a converter arrangement according to a further embodiment of the invention.
Figure 10:
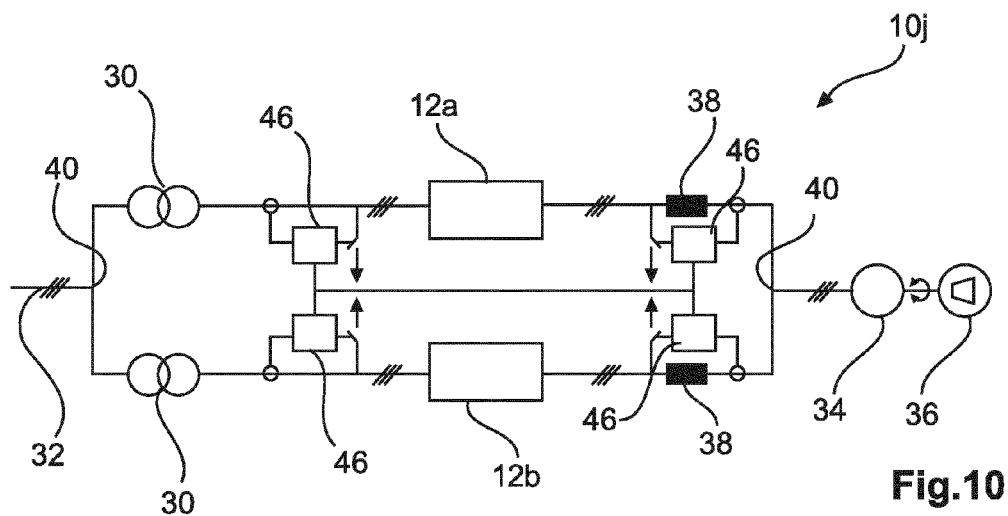
FIG. 10 schematically shows a converter arrangement according to a further embodiment of the invention.
Figure 11:
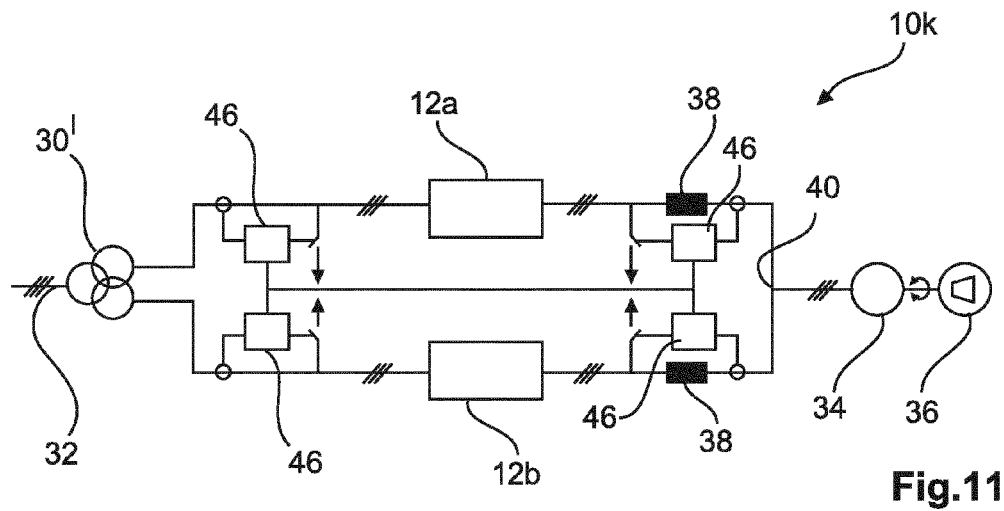
FIG. 11 schematically shows a converter arrangement according to a further embodiment of the invention.

FIG. 9 to FIG. 11 show embodiments of converter arrangements 10i to 10k analogously to the converter arrangements 10d to 10f, respectively. Only the indirect converters are replaced with direct converters 12a, 12b as shown in FIG. 8.

The transformer 30, 30' and the electrical machine 34 may have different options for their windings in a multiphase configuration. In the following, possible options are listed:

The high-voltage-side (primary) windings of the transformer 30, 30' may be Y-connected and may have a neutral point connection.

The winding configuration for the two-winding transformer 30 may be YN yn or YN d.

The winding configuration for the three-winding transformer 30' may be YN yn yn, YN yn d or YN d d.

The winding configuration of the electrical machine may be Yn, Y or D.

The following table shows a comparison for two-winding transformer 30 winding types

| YN yn | YN d |
|---|---|
| Worse core utilization for the same step-up ratio | Better core utilization for the same step-up ratio |
| Preferred for large inter-tie transformers | Preferred for large generating unit transformers |
| Secondary-(converter-) side neutral point can serve as the converter system ground potential | The converter arrangement ground potential should be supplied at the machine side (or somewhere, somehow inside the converter) |

The following table shows a comparison for three-winding transformer winding types

| YN yn yn | YN yn d | YN d d |
|---|---|---|
| No phase-shift between the secondary windings | Phase shifts between the secondary windings cancel certain harmonic current | No phase-shift between the secondary windings |

The following table shows a comparison for machine winding types

| Yn | Y | D |
|---|---|---|
| Neutral point is available to serve the system ground potential | Neutral point is unavailable. The system ground should be supplied by the transformer (or somewhere, somehow inside the converter | Neutral point is unavailable. The converter arrangement ground should be supplied by the transformer (or somewhere, somehow inside the converter |

Based on the available winding options, there are certain possible configurations considering that the ground potential should be provided at least at the transformer side and/or the machine side.

The following configurations are the favored ones for the following reasons:
Transformer windings YN d, YN d d: Transformer delta connection at the MV (secondary) side is usually better for transformer core utilization in voltage step-up.
Machine windings Yn: Because of the delta-connected transformer, the machine needs to serve the neutral point.
Transformer windings YN d d: Since the converter currents are very high quality sinusoidal, there may be no need for enhancing them via transformer winding arrangement.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10a to 10k converter arrangement
12a, 12b modular multilevel converters
14a, 14b subconverters
16 converter branch
17, 17' DC link
18 branch connection point
20, 20' converter cell
22 semiconductor switch
24 cell capacitor
26 snubber circuit
28 branch inductance
30, 30' transformer
32 electrical grid
34 motor
36 turbine
38 inductance
40 phase connection point
42 filter
44 converter protection system
46 subconverter protection system
48 fault detection device
50 mechanical switch
52 controller

The invention claimed is:

1. A converter arrangement, wherein the converter arrangement comprises:
at least first and second modular multilevel converters; wherein each of the at least first and second modular multilevel converters comprises at least
two converter branches; wherein each converter branch comprises
a plurality of serious-connected converter cells, each converter cell comprising
a cell capacitor and semiconductor switches for connecting the cell capacitor to the converter branch; wherein the at least
two converter branches of the first modular multilevel converter are connected via a first branch connection point and the at least
two converter branches of the second modular multilevel converter are connected via a second branch connection point; wherein the at least
first and second multilevel converters are connected in parallel via a phase connection point for connecting the converter arrangement to a load or a power source, wherein
the phase connection point is connected via a first inductance with the first branch connection point and/or via a second inductance with the second branch connection point, wherein at least
one of the first and second modular multilevel converters comprises a protection system, which comprises:
a fault detection device;
a mechanical or paraelectronic switch for interconnecting at least two phases at the branch connection point of the associated modular multilevel converter; and
a controller adapted for switching converter cells of the associated modular multilevel converter to zero output voltage and for closing the switch, when receiving a fault signal from the fault detection device, wherein
the fault detection device comprises a current sensor for sensing an over-current in the at least two phases at the phase connection point; and/or
wherein the current sensor is adapted for measuring a current between the phase connection point and the first and/or second inductance before the branch connection point.

2. The converter arrangement of claim 1, wherein each of the first and second modular multilevel converters comprises
converter branches for at least two phases, and either
the converter branches of each phase are connected via an inductance for each phase with the phase connection point for each phase or
a pair of two converter branches of the first and the second modular multilevel converter share one or more inductances.

3. The converter arrangement of claims 2,
wherein each of the at least two converter branches of each of the at least first and second modular multilevel converters is connected via a branch inductance with the respective converter branch connection point.

4. The converter arrangement of claims 2
wherein the first and second modular multilevel converters are direct converters.

5. The converter arrangement of claim 2,
wherein the at least first and second modular multilevel converters are galvanically connected via a load-side phase connection point to a load or a power source;
wherein the load-side phase connection point is connected via a first load-side inductance with a first load-side branch connection point and via a second load-side inductance with a second load-side branch connection point.

6. The converter arrangement of claim 2,
wherein the converter arrangement comprises a transformer and the at least first and second modular multilevel converters are connected via a transformer-side phase connection point with the transformer, such that the at least first and second modular multilevel converters are galvanically connected;

wherein the transformer-side phase connection point is connected via a first transformer-side inductance with a first transformer-side branch connection point and via a second transformer-side inductance with a second transformer-side branch connection point.

7. The converter arrangement of claims 1,
wherein each of the at least two converter branches of each of the at least first and second modular multilevel converters is connected via a branch inductance with the respective converter branch connection point.

8. The converter arrangement of claim 7,
wherein the at least first and second modular multilevel converters are galvanically connected via a load-side phase connection point to a load or a power source;
wherein the load-side phase connection point is connected via a first load-side inductance with a first load-side branch connection point and via a second load-side inductance with a second load-side branch connection point.

9. The converter arrangement of claims 7,
wherein the first and second modular multilevel converters are direct converters.

10. The converter arrangement claim 1,
wherein the at least first and second modular multilevel converters comprise a subconverter for converting an AC current into an DC current.

11. The converter arrangement of claim 1,
wherein each of the at least first and second modular multilevel converters is an indirect converter comprising an active rectifier connected via a DC link with an inverter.

12. The converter arrangement of claim 11,
wherein the first modular multilevel converter comprises a first DC link and the second modular multilevel converter comprises a second DC link, which is galvanically separated from the first DC link.

13. The converter arrangement of claim 11,
wherein the at least first and second modular multilevel converters comprise a common DC link.

14. The converter arrangement of claim 1
wherein the first and second modular multilevel converters are direct converters.

15. The converter arrangement of claim 1,
wherein the converter arrangement comprises a transformer and the at least first and second modular multilevel converters are connected via a transformer-side phase connection point with the transformer, such that the at least first and second modular multilevel converters are galvanically connected;
wherein the transformer-side phase connection point is connected via a first transformer-side inductance with a first transformer-side branch connection point and via a second transformer-side inductance with a second transformer-side branch connection point.

16. The converter arrangement of claim 1,
wherein the at least first and second modular multilevel converters are galvanically separated on a transformer side;
wherein the first modular multilevel converter is connected via a first transformer to a phase connection point and the second modular multilevel converter is connected via a second transformer to the phase connection point; or
wherein the first modular multilevel converter is connected to a first secondary winding of a transformer and the second modular multilevel converter is connected to a second secondary winding of the transformer.

17. The converter arrangement of claim 1,
wherein the at least first and second modular multilevel converters are galvanically connected via a load-side phase connection point to a load or a power source;
wherein the load-side phase connection point is connected via a first load-side inductance with a first load-side branch connection point and via a second load-side inductance with a second load-side branch connection point.

18. The converter arrangement of claim 1,
wherein the controller is adapted for closing the switch after a predefined time ($\Delta T$) after the switching the converter cells to zero output voltage; and/or
wherein the predefined time does not differ more than 10% from the period of a frequency of a current in the branch connection point.

19. The converter arrangement of claim 18,
wherein the converter arrangement comprises at least two modular multilevel converters, which are connected in parallel via a common phase connection point and/or at least two modular multilevel converters, which are connected in series via a DC link;
wherein the converter arrangement comprises a protection system for each of the at least two converters;
wherein, when receiving a fault signal, one first protection system is adapted for transmitting the fault signal to another second protection system, which is adapted for switching converter cells of an associated converter to zero output voltage and for closing an associated switch, when receiving a fault signal from the first protection system.

20. The converter arrangement of claim 1,
wherein the converter arrangement comprises at least two modular multilevel converters, which are connected in parallel via a common phase connection point and/or at least two modular multilevel converters, which are connected in series via a DC link;
wherein the converter arrangement comprises a protection system for each of the at least two converters;
wherein, when receiving a fault signal, one first protection system is adapted for transmitting the fault signal to another second protection system, which is adapted for switching converter cells of an associated converter to zero output voltage and for closing an associated switch, when receiving a fault signal from the first protection system.

* * * * *